(12) United States Patent
Wagner

(10) Patent No.: US 6,741,999 B2
(45) Date of Patent: May 25, 2004

(54) STRING TREE UTILITY DATA STRUCTURE AND ORDER N SORT

(75) Inventor: Richard J. Wagner, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 298 days.

(21) Appl. No.: 09/813,331

(22) Filed: Mar. 20, 2001

(65) Prior Publication Data
US 2002/0174130 A1 Nov. 21, 2002

(51) Int. Cl.[7] ............................................. G06F 17/30
(52) U.S. Cl. .................. 707/103 Y; 707/10; 707/100
(58) Field of Search .............................. 707/100, 101, 707/10, 102, 103 R, 103 Y, 103, 103 Z

(56) References Cited

U.S. PATENT DOCUMENTS

| | | | | |
|---|---|---|---|---|
| 5,202,986 A | * | 4/1993 | Nickel | 707/3 |
| 5,274,805 A | * | 12/1993 | Ferguson et al. | 707/7 |
| 6,141,655 A | * | 10/2000 | Johnson et al. | 707/2 |
| 6,175,835 B1 | * | 1/2001 | Shadmon | 707/102 |
| 2002/0120598 A1 | * | 8/2002 | Shadmon et al. | 707/1 |

OTHER PUBLICATIONS www.cs.princeton.edu/ugradpgm/spe/summer02/melson/.*
www.cs.oberlin.edu/cs280/Lectures/lec7.ppt.*
www.csm.astate.edu/~rossa/datastruc/kasiski.html.*
Tenenbaum, Aaron M. and Augenstein, Moshe J.; Data Structures Using Pascal; Prentice–Hall Inc.; 1981; pp. 515–520.*

* cited by examiner

Primary Examiner—Diane D. Mizrahi
(74) Attorney, Agent, or Firm—John A. Miller; Warn, Burgess & Hoffmann, P.C.

(57) ABSTRACT

A data structure according to the invention is created in memory of a computer for storing data objects for access by a computer application that is executed by the computer. Each of the data objects is associated with a key. The data structure includes a root node object. Additional node objects are added to the root node object based on the characters in the key. The depth of the data structure is equal to the number of characters in the keys. The data structure is ideally suited for efficiently sorting the data objects.

16 Claims, 7 Drawing Sheets

FIG. 1
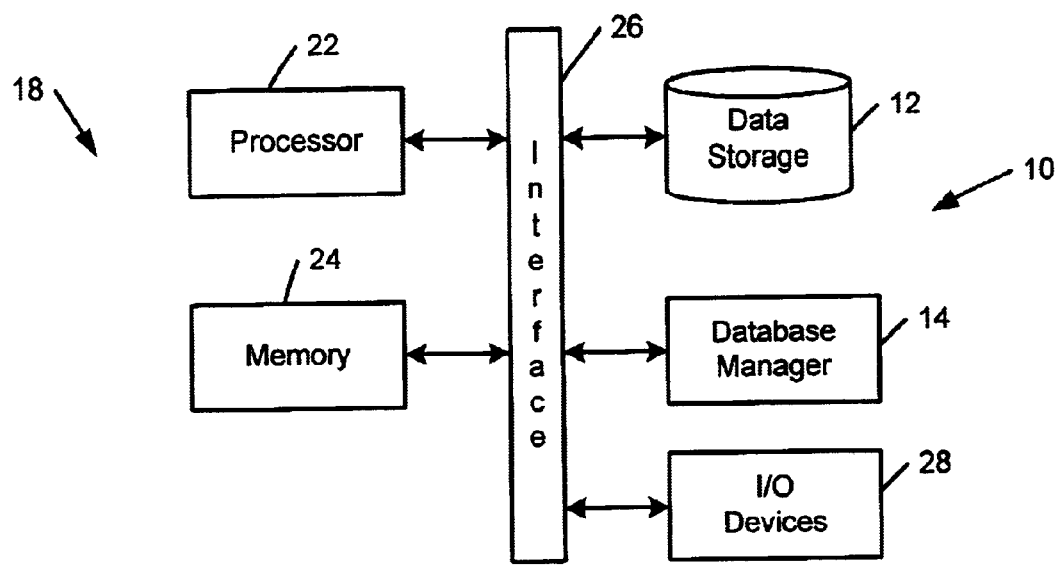
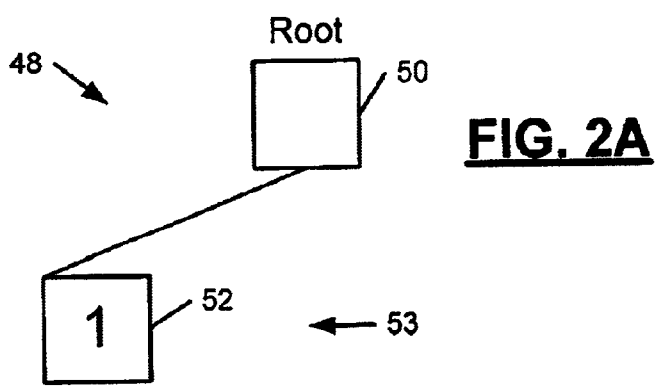
FIG. 2A

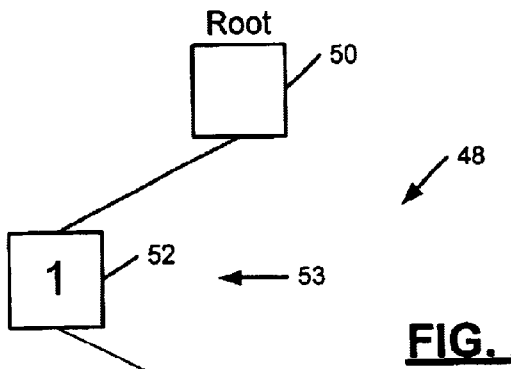
FIG. 2B
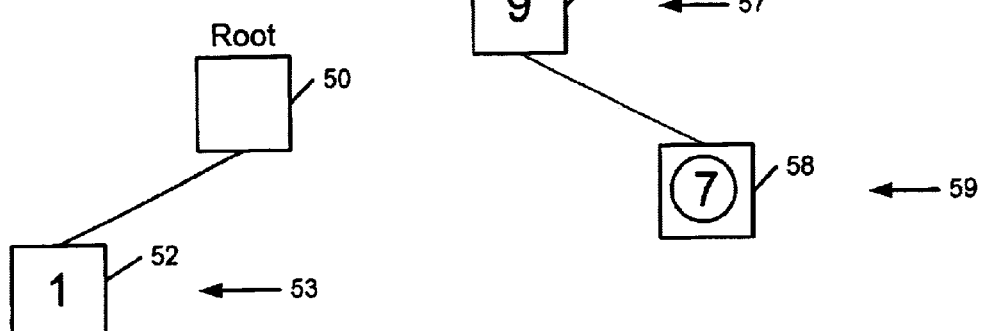
FIG. 2C
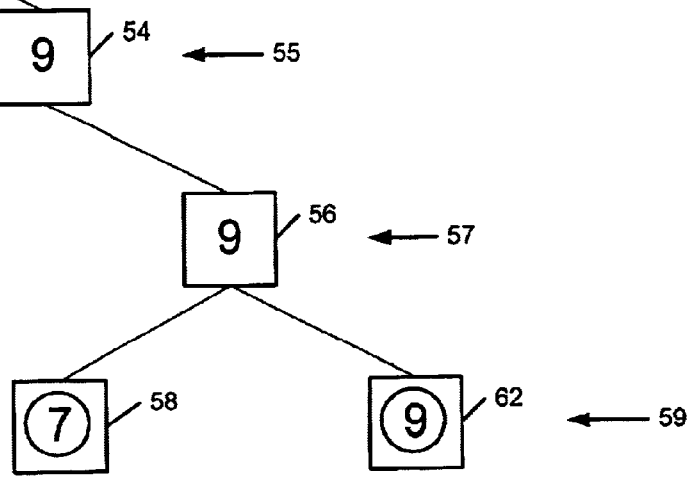

FIG. 6

| | Function | Time Complexity (allows duplicate keys) | Time Complexity (no duplicate keys) | Comment |
|---|---|---|---|---|
| 1 | Insert an object with a key string into a container. | $O(1)$ | $O(\log n)$ | $n$ is the number of objects stored in the container. |
| 2 | Determine whether an object is in a container based on some key string for the object. | $O(1)$ | $O(\log n)$ | |
| 3 | Retrieve an object from a container based on some key string. | $O(1)$ | $O(\log n)$ | |
| 4 | Determine how many of an object with the same key exist in a container. | $O(1)$ | | Does not apply if duplicate keys are not allowed. |
| 5 | Write the objects from a container into an array in sorted order based on their keys. | $O(n)$ | $O(n \log n)$ | |

STRING TREE UTILITY DATA STRUCTURE AND ORDER N SORT

FIELD OF THE INVENTION

This invention relates to data structures and sorting algorithms that are used in computer programs such as databases, spreadsheets, organizers, word processors and any other computer program that employs sorting.

BACKGROUND OF THE INVENTION

Computer programs such as databases organize data that may be in the form of stock prices, addresses, money, dates, statistics, phone numbers, recipes, probabilities, etc. Each individual piece of data, standing alone, is generally not very informative. Database applications make data more useful because they help users organize and process the data. The database application allows the user to compare, sort, order, merge, separate and interconnect the data. As a result, the database user is able to generate useful information from the data.

Many other computer programs also involve sorting and other forms of database management. For example, electronic spreadsheets calculate complicated mathematical formulas and sort and extract mathematical and textual data. Accounting and inventory programs are also specialized databases. Even word processors use sorting and other database functions in their spell check and mail merge operations.

The time that a computer application requires to perform fundamental data operations such as sorting determines the overall speed of the computer application because these operations are often performed frequently. The fundamental data operations include: the time required to insert the data into a container; the time required to locate the data that is associated with a key; the time required to retrieve data from the container using the key; the time required to count the number of data entries having the same key (where duplicate keys are allowed); and, the time required to write data from the container to an array in sorted order based upon the keys. As can be appreciated, any improvements in the performance of these fundamental operations can significantly improve the overall performance of the computer application.

Natural numbers expressed conventionally (base 10 or base 2) as a string of digits have a word length of log n, where n is the number expressed. When using string or numerical keys to retrieve data objects, the key length must grow as log n if duplicate keys are to be avoided. In many practical situations, however, the key length is arbitrarily bounded. Duplicates are avoided because the number of objects (n) in the database is bounded by practical considerations. For example, 9-digit social security numbers (SSNs) are used to uniquely identify people in the United States. Bounding the keyword size allows the implementation of an order n sort function for objects with either numerical or general string keys.

As set forth in Cormen, Leiserson, and Rivest, "Introduction to Algorithms", MIT Press, (1990), the theoretical best time complexity for sorting by comparison a set of objects with unique keys is Omega(n log n). By the definition of a set, duplicates are not allowed. As n increases, the length of the key (field width or number of digits in the key) increases as log n. This would apply, for example, to an application that stores a large set of objects that are keyed to serial numbers. In Nilsson, "The Fastest Sorting Algorithm?", Dr. Dobb's Journal, April 2000, an O(n log log n) integer sorting algorithm is disclosed that allows duplicate keys.

Many practical applications have a fixed key length, such as the 9-digit social security number (SSN), name string (last+first+middle), or other property of the stored object. If, as in a relational database, duplicate keys are not allowed, the fixed key length puts an upper limit on storage capacity that is not usually reached in practice. Known O(n) sorting algorithms such as counting sort, radix sort, and bucket sort impose an upper bound on n.

Therefore, data structures and sorting algorithms that will improve the speed and efficiency of the fundamental data operations of computer applications would be desirable.

SUMMARY OF THE INVENTION

A data structure according to the invention is created in memory of a computer. The data structure stores data objects for access by a computer application that is executed by the computer. Each of the data objects is associated with a digit or character of key. The data structure includes a root node object and a first node object that is a first child of the root node object. The first node object includes a first node ID property that is assigned a first character of a first key that is associated with a first data object. A second node object is a first child of the first node object and includes a second node ID property that is assigned a second character of a first key that is associated with the first data object. A third node object is a second child of the root node object and includes a third node ID property. The third node ID property is assigned a first character of a second key that is associated with a second data object if the first character of the first key is different that the first character of the second key.

According to other features of the invention, the first, second and third node objects include a parent pointer property that points to a parent of the first, second and third node objects. The first, second and third node objects include a child pointer property that points to children of the first, second and third node object objects. The first and third node objects are at a first node level and the second node object is at a second node level. The first data object is stored in a data queue property of a node object at an nth level where n is equal to a number of characters in the first key.

According to other features, the first, second and third node objects include a data flag property that indicates whether a node object is associated with a data object. The first, second and third node objects include a data queue property that stores a data object. A depth-first traversal of the data structure encounters the data objects in alphabetical order of the keys and a breadth-first traversal encounters the data objects in numerical order of the keys.

In another aspect of the invention, a data structure according to the invention is created in memory of a computer for storing data objects for access by a computer application that is executed by the computer. Each of the data objects is associated with a key. The data structure includes a root node object and a first node object that is a first child of the root node object. The first node object includes a first node ID property that is assigned a first character of a first key that is associated with a first data object. A second node object is a first child of the first node object and includes a second node ID property that is assigned a second character of a first key that is associated with the first data object. A third node object is a second child of the first node object and that includes a third node ID property. The third node ID property is assigned a second character of a second key that is associated with a second data object if the first character of the first key is the same as the first character of the second key.

In other objects of the present invention, the data structure is used to sort the data objects.

Still other objects, features and advantages will be apparent from the specification, the claims and the drawings.

BRIEF DESCRIPTION OF THE DRAWINGS

FIG. 1 is a functional block diagram of a computer that includes a computer application with a data manager and data storage;

FIGS. 2A–2D illustrate example data objects that employ a string tree utility data structure according to the present invention;

FIG. 6 is a tabular description of string tree utility data structure functions and their associated time complexities.

DETAILED DESCRIPTION OF THE PREFERRED EMBODIMENTS

Figure 2D:
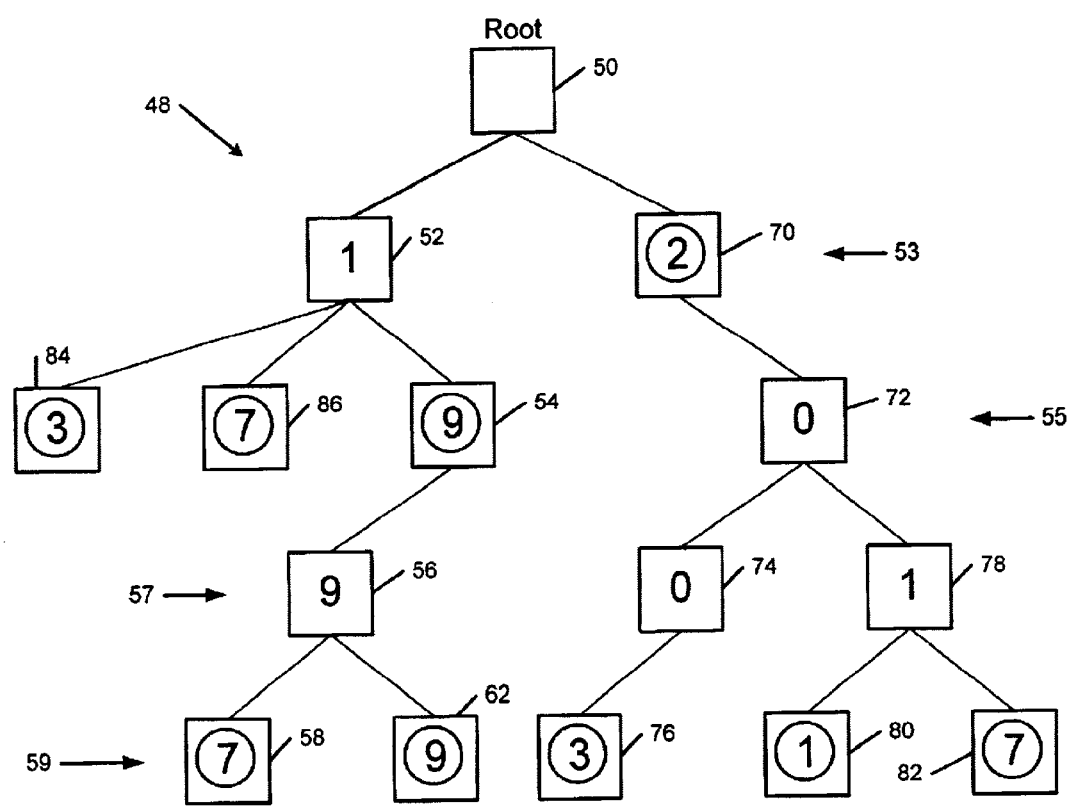

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

The string tree utility data structure according to the present invention provides keyed storage of data objects. The depth of the tree is equal to the length of the largest key. This constant bound on the depth of the tree allows the implementation of a linear sort algorithm that will be described further below. The sort algorithm that is based on the string tree utility data structure is stable. In other words, the sort algorithm preserves the initial order of items with equal keys. While conventional order (n) sorting algorithms such as counting sort, radix sort and bucket sort impose an upper bound on the number of keys n, the sort algorithms based on the string tree utility data structure do not pose a limit on the number of keys n. However, as n grows without bound, duplicates will be encountered when the key word length is less than log n.

Referring now to FIG. 1, a computer application 10 is illustrated and includes data storage 12 and a data manager 14. The computer application 10 is preferably operated on a computer 18 that includes a processor 22, memory 24 (such as random access memory (RAM), read only memory (ROM), or other electronic storage) and an input/output (I/O) interface 26. The computer 18 can also include one or more I/O devices 28 such as a computer display, keyboard, a printer, a mouse, etc. The computer application 10 is preferably a database application. The computer application 10 can also be a spreadsheet, organizer, word processor or any other computer application that involves the fundamental data operations. The data manager 14 performs the fundamental data operations on the data in the data storage 12.

When performing the fundamental data operations, the data manager 14 employs the string tree utility data structure according to the present invention. Referring now to FIGS. 2A–2D, when the data manager 14 inserts objects into a container, the data manager initially creates a tree root. Keys that are used for inserting objects into the container can be any natural number or string, such as serial numbers, Social Security Numbers (SSN), names, ages, descriptions, years, etc. Then, the data manager 14 reads a first character of a key associated with a first data object. A new node object 52 is created with the first character assigned to the node-ID of the node object 52.

Each node object preferably includes parent pointer, child pointer, data queue, node identification (ID), and data flag properties. The data queue property contains zero or more data objects. The child pointer property points to zero or more child node objects of the node object. The node object will always have only one node object identified by the parent pointer property but can have more than one node object that is identified by the child pointer property. In other words, the child pointer property can be a queue, array, or other linear data structure. The data flag property indicates whether the node object has data in its data queue. The node ID property contains the key digit or character that is assigned to the node object.

To illustrate how the string tree utility data structure works, exemplary data will be employed. Five objects (cat, dog, horse, rabbit, and bird) are associated with five keys (1997, 1999, 2003, 2011, and 2017), respectfully. Skilled artisans will appreciate that the objects and keys can be varied from the foregoing example.

According to the example, the first object (cat) is associated with the first key (1999). Since there are no child nodes of the root node, the character "1" is assigned to the node ID property of the node object 52, which is the first child node of the root node 50. The child pointer property of the root node is set equal to the node object 52. The parent pointer property of the node object 52 is set equal to the root node 50. A second character "9" of the first key is inserted into the node ID property of a node object 54, which is a child of the node object 52. The parent pointer property of the node object 54 is set to the node object 52. The child pointer property of the node object 52 is set to the node object 54.

A third character "9" of the first key is inserted into the node ID property of a node object 56, which is a child of the node object 54. The parent pointer property of the node object 56 is set to the node object 54. The child pointer property of the node object 54 is set to the node object 56.

A fourth character "7" of the first key is inserted into a node object 58, which is a child of the node object 56. The parent pointer property of the node object 58 is set to the node object 56. The child pointer property of the node object 56 is set to the node object 58. Because there are no more characters in the first key, the first object (cat) is pushed into the data queue property that is associated with the node object 58. The data flag property of the node object 58 is flagged to indicate that the first object (cat) that is associated with the first key (1997) is stored in the node object 58. Note that the algorithm also works taking the key string in reverse order.

The string tree utility data structure that is implemented by the data manager 14 processes the second object (dog) that is associated with the second key (1999). A first character ("1") of the second key is compared to node ID properties of node objects identified by the child pointer property of the root node 50. Because there is a match, a second character ("9") of the second key is compared to the node ID properties of node objects identified by the child pointer property of the node object 52. Because there is a match, a third character ("9") of the second key is compared to the node ID properties of node objects identified by the child pointer property of the node object 54. Because there is a match, a fourth character ("9") of the second key is compared to the node ID properties of node objects identified by the child pointer property of the node object 56. Because the fourth character does not match any of the child nodes, a node object 62 is created. Since there are no more characters in the second key, the second object (dog) is pushed into the data queue property that is associated with the node object 62. The data flag property of the node object 62 is also flagged to indicate that the second object (dog) that is associated with the second key (1999) is stored in the node object 62. The parent pointer property of the node object 62 is set to the node object 56. The child pointer property of the node object 56 is set to the node object 62 (and node object 58 previously). In the interest of brevity, the remaining discussion of this example will omit the description of setting the child and parent pointers.

Likewise, the third, fourth and fifth data objects that are associated with the third, fourth and fifth keys, respectively are inserted into the string tree utility data structure as can be seen in FIG. 2D. Additional node objects 70, 72, 74, 76, 78, 80, 82, 84 and 86 are created in a manner similar to that described above. Node object 76 is created by the third data object and the third key (2003). The data flag property of the node object 76 is flagged and its data queue property contains the third data object (horse). Node object 80 is created by the fourth data object and the fourth key (2011). The data flag property of the node object 80 is flagged and its data queue property contains the fourth data object (rabbit). Node object 82 is associated with the fourth key (2017). The data flag property of the node object 82 is flagged and its data queue property contains the fourth data object (bird).

The string tree utility data structure is not a binary tree. Therefore, each node can have more than two children. Furthermore, the key length need not be uniform or unique. In the example depicted in FIGS. 2A–2D, five additional data objects (zebra, lion, squirrel, mouse, and peacock) are associated with five keys (2, 13, 17, 200, and 2003). The sixth data object (zebra) is stored in the data queue associated with the node object 70. The data flag property of the node object 70 is flagged and is associated with the sixth key (2). As can be appreciated from the preceding insertion, the key can be of variable length. The seventh data object (lion) is stored in the data queue property associated with the node object 84. The data flag property of the node object 84 is flagged and is associated with the seventh key (13).

The eighth data object (squirrel) is stored in the data queue property associated with the node object 86. The data flag property of the node object 86 is flagged and is associated with the eighth key (17). The ninth data object (mouse) is stored in the data queue property associated with the node object 74. The data flag property of the node object 74 is flagged and is associated with the ninth key (200). As can be appreciated from the preceding insertion, data objects can be added to the data queue property of node objects that are already in existence. The tenth data object (peacock) is stored in the queue associated with the node object 76 that already contains the third data object (horse). The data flag of the node object 76 is flagged and is associated with the tenth key (2003) that is a duplicate of the third key (2003). In other words, data objects having the same key are stored by pushing the data object into the data queue property of the same node object. The objects in the queue are recovered by popping until the data queue property is empty.

All of the insert operations set forth above have a time complexity on the order of the depth of the tree. The depth of the tree is equal the number of digits or characters in the longest key. For bounded-length keys, the insert operation is performed in constant time. For unbounded keys, such as for storing unbounded integer keys themselves, the depth of the tree is log n, where n is the largest key stored. The key itself can be recovered by traversing upward using the parent pointers to the root node.

Figure 3:
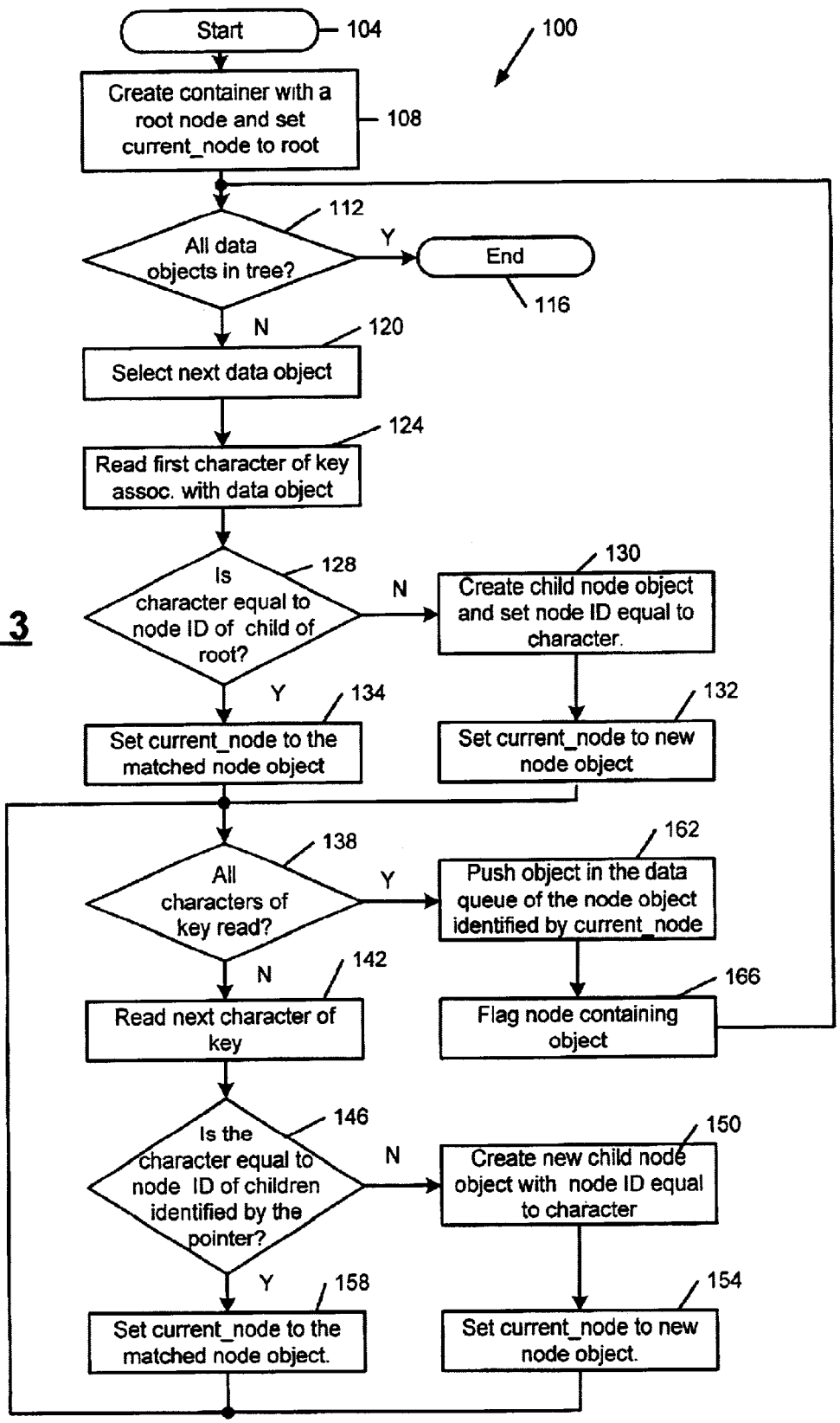
FIG. 3 is a flowchart illustrating steps for creating the string tree utility data structure.

Referring now to FIG. 3, steps for a sorting algorithm 100 that are performed by the data manager 14 in accordance with the string tree utility data structure are shown. Initially the data objects are inserted into the string tree utility datastructure. Control begins at step 104. Control continues with step 108 where a string tree datastructure container with a root node is created and a current_node pointer is set equal to the root node. In step 112, control determines whether all of the data objects have been placed in the string tree datastructure container. If they have, control ends at step 116. Otherwise, control continues with step 120 where a data object is selected. At step 124, a first character of a key that is associated with the selected data object is read. In step 128, control determines whether the first character is equal to a node ID of a child of the root node object. If not, a new child node object is created in step 130 and its node ID is assigned the first character. In step 132, the current_node is set to the new child node object. Otherwise, if the first character is equal to the node ID of a child of the root node object, the current_node is set to the matched child node object child in step 134.

At step 138, control determines whether all of the characters of the key that is associated with the data object have been read. If not, the next character of the key is read in step 142. In step 146, control determines whether the character is equal to a node ID of a child of the node object that is identified by the current_node. If not, control continues with step 150 where control creates a new child node object and assigns the character to its node ID. Control continues with step 154 where the current_node is set to the new child node object. Otherwise, if the character is equal to a node ID of a child node object identified by the current_node as determined in step 146, the current_node is set to the matching child node object in step 158. If all of the characters of the key have been read as determined in step 138, control continues with step 162 where the data object is pushed into the data queue of the node object that is identified by the current_node. In step 166, the data flag of node object is flagged. Control continues from step 166 to step 112.

Figure 4:
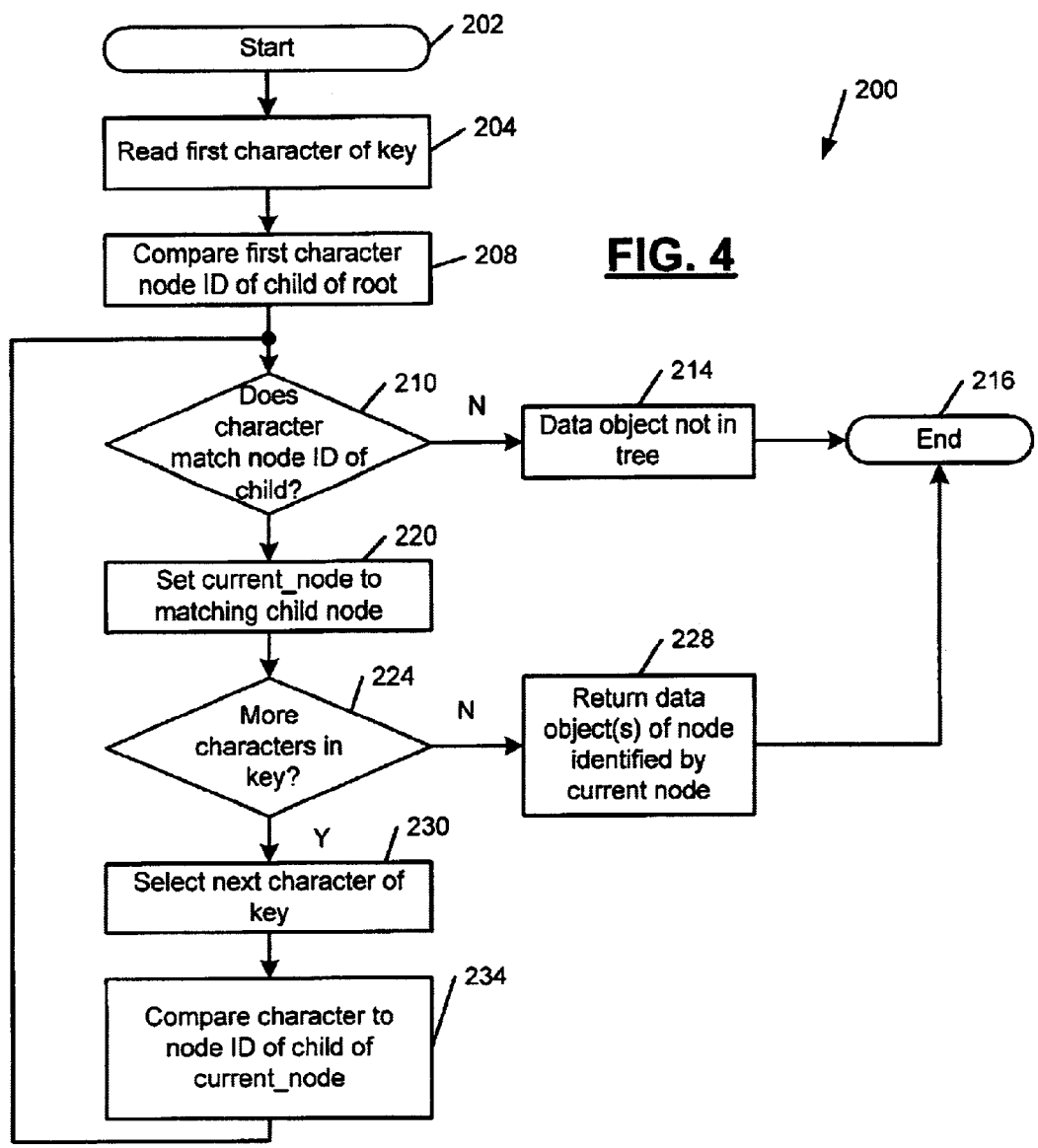
FIG. 4 is a flowchart illustrating steps for finding an object within the string tree utility data structure using a key.

Referring now to FIG. 4, steps for finding a data object having a specified key are illustrated generally at 200. Control begins with step 202. In step 204, a first character of the key is read. In step 208, the first character is compared to the node ID of children of the root node object. In step 210, control determines whether the character matches the node ID of a child of the node object. If not, control indicates that there are no data objects having the specified key in the container in step 214 and control ends at step 216.

If the character matches a child, as determined in step 210, a pointer is set to the child in step 220. In step 224, control determines whether there are more characters in the key. If not, control continues with step 228 where the object(s) of the node identified by the pointer are returned. Control continues with step 216 where control ends. Otherwise if there are more characters in the key as determined in step 224, the next character of the key is selected in step 230. In step 234, the character is compared to the node ID of children of the node object identified by the current_node and control continues with step 210. The time for finding an object is on the order of the depth of the tree, which is constant for keys of bounded field width.

Figure 5:
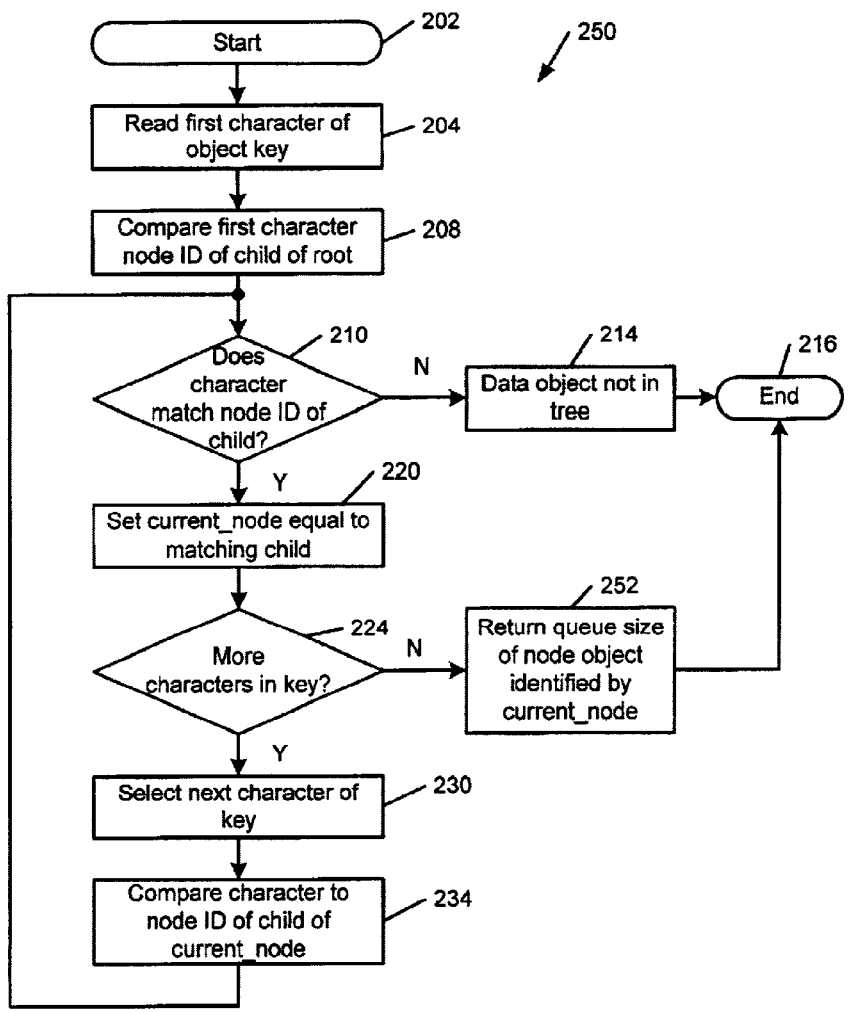
FIG. 5 is a flowchart illustrating steps for counting objects that are associated with a key in the string tree utility data structure.

Referring now to FIG. 5, steps for counting data objects having the specified key are illustrated generally at 250. Reference numbers from FIG. 4 will be used to identify similar steps. Step 228 of FIG. 4 is replaced by a step 252. Step 252 returns the size of the data queue of the node object that is identified by the current_node. Control continues from step 252 to step 216 where control ends. Time complexity for counting objects is also on the order of the depth of the tree, which is constant for keys of bounded field width.

Referring now to FIG. 6, the time complexity of the fundamental data operations using the string tree utility data structure are tabulated. The storage space required for the objects is O(n). Combining the functions 1–5 in FIG. 6 gives an O(n) sort algorithm for objects with bounded-length keys (for example people sorted by Social Security Number). The duplicates-allowed functions may be used with fixed field key relational databases if external mechanisms are used to preclude duplicate keys, as is conventional in practice.

Ordering data objects in key order has two variations. One variation includes data objects with numerical keys. In the first variation, the data objects are written to an array in numerical order. A second variation includes data objects with string keys. In the second variation, the data objects are written to an array in alphabetical order. For example, an unordered string of digits (1, 111, 10, 101, 11) representing numbers have a numerical order (1, 10, 11, 101, 111) and an alphabetical order (1, 10, 101, 11, 111). A convenient property of the string tree utility data structure is that a pre-order (depth-first) traversal encounters the data objects in alphabetical order of the keys. A breadth-first traversal encounters the data objects in numerical order.

The time required to visit every node in the tree is O(n) where n is the number of data objects stored in the tree. This applies to both variations of the traversal function because each node of the tree is visited. This also holds true for trees where data objects are stored only as leaves because the number of internal nodes for any tree with a bounded branching factor (which is a property of the string tree) is a constant function of the number of leaves in the tree. For string trees with unbounded depth (as in the case of unbounded key lengths (which must hold for the no-duplicates case)), the traversal time is O(n log n).

An exemplary implementation of the string tree utility data structure is set forth in the Appendix to demonstrate general functionality. Skilled artisans can appreciate that the implementation in the Appendix is merely for illustration purposes only and is not meant to limit the present invention. The performance tests of the string tree utility data structure corroborate the complexity analysis set forth in the tables of FIG. 6. The string tree utility data structure was implemented in C++ and tests were performed with data objects. The data objects include rocks (with a serial number identification (0 to n) and color represented as a character array (red, green, blue, etc. (16 colors)). Functions create arrays of the rock pointers. Rocks were created by assigning colors at random with sequential keys. The rocks are permuted randomly in the array to test the sorting functions. The Appendix includes the C++ code for sorting the rocks by color. The sorting is accomplished by first inserting all of the rocks into a new tree (time order n). Then, order is accomplished by traversing the tree and storing the rocks in an array (time order n). As can be appreciated, the string tree utility data structure is easy to use for sorting applications. The sorting algorithm performed as predicted in the complexity analysis.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, the specification and the following claims.

APPENDIX

```
// Sort rocks by color:
void rocksByColor(int iNumRocks)
{
    int i = 0;                                        // Loop index.
    int iManual = 0;                                  // Flag for manual entry.
    Rock** array;                                     // Array of rock pointers.
    StringTreeNode<Rock>* rockRoot = NULL;            // Root of the tree of
rocks.
    double dfProc = 0;                                // Statistical info
                                                        variable.
    if (iNumRocks == 0)                               // Get number from the
                                                        user.
    {
        iManual = 1;
        cout << endl;
        cout << "Sort rocks by color:" << endl << endl;
        cout << "How many rocks do you want to sort? ";
        cin >> iNumRocks;
    }
    array = new Rock*[iNumRocks];                     // Create array of
                                                        pointers.
    buildRocks(array, iNumRocks);                     // Create rocks randomly.
    rockRoot = new                                    // The root of the tree.
StringTreeNode<Rock>(' . ');
    for (i = 0; i < iNumRocks; i++)                   // Insert the rocks into the
                                                        tree.
    {
        rockRoot->addObject(array[i]->getColor( ), array[i]);
    }
    i = 0;
    rockRoot->preOrderStoreObjects(array, i);         // Traverse in preorder
                                                      // and store the rocks
    dfProc = ((double) clock( )) / CLOCKS_PER_SEC; // 1000 clocks/s
    if (iManual)
    {
        cout << endl;
        for (i = 0; i < iNumRocks; i++)
        {
            array[i]->print( );
        }
    }
    else
    {
        cout << endl << " Processor time = " << dfProc << endl;
    }
}
```

What is claimed is:

1. A data structure created in memory for storing and sorting data objects for access by a computer application that is executed by a computer, wherein each of said data objects is associated with a key, comprising:

a root node object;

a first node object that is a first child of said root node object and that includes a first node ID property that is assigned a first character of a first key that is associated with a first data object;

a second node object that is a first child of said first node object and that includes a second node ID property that is assigned a second character of the first key that is associated with said first data object; and a third node object that is a second child of said root node object and that includes a third node ID property that is assigned a first character of a second key that is associated with a second data object if said first character of said first key is different that said first character of said second key, wherein multiple data objects that are identified by the same key are stored in the same node object so that the data objects are sorted in the data structure, and wherein data objects that are stored in a node object are contained in a data queue property in which the multiple data objects are sorted, and wherein the data structure provides an order (n) sort of the data objects where (n) is the number of data objects stored in the data structure.

2. A data structure created in memory for storing and sorting data objects for access by a computer application that is executed by a computer, wherein each of said data objects is associated with a key, comprising:

a root node object;

a first node object that is a first child of said root node object and that includes a first node ID property that is assigned a first character of a first key that is associated with a first data object and a first node object parent pointer property that points to a parent of said first node object;

a second node object that is a first child of said first node object and that includes a second node ID property that is assigned a second character of the first key that is associated with said first data object and a second node object parent pointer property that points to a parent of said second node object; and a third node object that is a second child of said root node object and that includes a third node ID property that is assigned a first character of a second key that is associated with a second data object if said first character of said first key is different that said first character of said second key and a third node object parent pointer property that points to a parent of said first, second and third node objects, wherein multiple data objects that are identified by the same key are stored in the same node object so that the data objects are sorted in the data structure, and wherein data objects that are stored in a node object are contained in a data queue property in which the multiple data objects are sorted, and wherein the data structure provides an order (n) sort of the data objects where (n) is the number of data objects stored in the data structure.

3. The data structure of claim 1 wherein said first, second and third node objects include a child pointer property that points to children of said first, second and third node object objects.

4. A data structure created in memory for storing and sorting data objects for access by a computer application that is executed by a computer, wherein each of said data objects is associated with a key, comprising:

a root node object;

a first node object that is a first child of said root node object and that includes a first node ID property that is assigned a first character of a first key that is associated with a first data object;

a second node object that is a first child of said first node object and that includes a second node ID property that is assigned a second character of the first key that is associated with said first data object; and a third node object that is a second child of said root node object and that includes a third node ID property that is assigned a first character of a second key that is associated with a second data object if said first character of said first key is different that said first character of said second key;

said first and third node objects being at a first node level, said second node object being at a second node level, and said first data object being stored in a data queue property of a node object at an nth level where n is equal to a number of characters in said first key, wherein multiple data objects that are identified by the same key are stored in the same node object so that the data objects are sorted in the data structure, and wherein data objects that are stored in a node object are contained in a data queue property in which the multiple data objects are sorted, and wherein the data structure provides an order (n) sort of the data objects where (n) is the number of data objects stored in the data structure.

5. A data structure created in memory for storing and sorting data objects for access by a computer application that is executed by a computer, wherein each of said data objects is associated with a key, comprising:

a root node object;

a first node object that is a first child of said root node object and that includes a first node ID property that is assigned a first character of a first key that is associated with a first data object and a first node object data flag property that indicates whether said first node object is associated with said first data object;

a second node object that is a first child of said first node object and that includes a second node ID property that is assigned a second character of the first key that is associated with said first data object and a second node object data flag property that indicates whether said second node object is associated with said first data object; and a third node object that is a second child of said root node object and that includes a third node ID property that is assigned a first character of a second key that is associated with a second data object if said first character of said first key is different that said first character of said second key and a third node object data flag property that indicates whether said third node object is associated with said second data object, wherein multiple data objects that are identified by the same key are stored in the same node object so that the data objects are sorted in the data structure, and wherein data objects that are stored in a node object are contained in a data queue property in which the multiple data objects are sorted, and wherein the data structure provides an order (n) sort of the data objects where (n) is the number of data objects stored in the data structure.

6. A data structure created in memory for storing and sorting data objects for access by a computer application that is executed by a computer, wherein each of said data objects is associated with a key, comprising:

a root node object;

a first node object that is a first child of said root node object and that includes a first node ID property that is assigned a first character of a first key that is associated with a first data object;

a second node object that is a first child of said first node object and that includes a second node ID property that is assigned a second character of the first key that is associated with said first data object; and a third node object that is a second child of said root node object and that includes a third node ID property that is assigned a first character of a second key that is associated with a second data object if said first character of said first key is different that said first character of said second key;

a depth-first traversal of said data structure encountering said data objects in alphabetical order of said keys and a breadth-first traversal encountering said data objects in numerical order of said keys, wherein multiple data objects that are identified by the same key are stored in the same node object so that the data objects are sorted in the data structure, and wherein data objects that are stored in a node object are contained in a data queue property in which the multiple data objects are sorted, and wherein the data structure provides an order (n) sort of the data objects where (n) is the number of data objects stored in the data structure.

7. A data structure created in memory for storing and sorting data objects for access by a computer application that is executed by a computer, wherein each data object is associated with a key, comprising:

a root node object;

a first node object that is a first child of said root node object and that includes a first node ID property that is assigned a first character of a first key that is associated with a first data object;

a second node object that is a first child of said first node object and that includes a second node ID property that is assigned a second character of the first key that is associated with said first data object; and a third node object that is a second child of said first node object and that includes a third node ID property that is assigned a second character of a second key that is associated with a second data object if said first character of said first key is the same as said first character of said second key and if said second character is not the same as a second character of said first key, wherein multiple data objects that are identified by the same key are stored in the same node object so that the data objects are sorted in the data structure, and wherein data objects that are stored in a node object are contained in a data queue property in which the multiple data objects are sorted, and wherein the data structure provides an order (n) sort of the data objects where (n) is the number of data objects stored in the data structure.

8. A data structure created in memory for storing and sorting data objects for access by a computer application that is executed by a computer, wherein each data object is associated with a key, comprising:

a root node object;

a first node object that is a first child of said root node object and that includes a first node ID property that is assigned a first character of a first key that is associated with a first data object;

a second node object that is a first child of said first node object and that includes a second node ID property that is assigned a second character of the first key that is associated with said first data object; and a third node object that is a second child of said first node object and that includes a third node ID property that is assigned a second character of a second key that is associated with a second data object if said first character of said first key is the same as said first character of said second key and if said second character is not the same as a second character of said first key;

a depth-first traversal of said data structure encountering said data objects in alphabetical order of said keys and a breadth-first traversal encountering said data objects in numerical order of said keys, wherein multiple data objects that are identified by the same key are stored in the same node object so that the data objects are sorted in the data structure, and wherein data objects that are stored in a node object are contained in a data queue property in which the multiple data objects are sorted, and wherein the data structure provides an order (n) sort of the data objects where (n) is the number of data objects stored in the data structure.

9. A method for generating a computer readable medium containing computer executable instructions and for creating a data structure for sorting data objects that are stored in a memory of a computer and that are associated with keys, comprising:

a) creating a data structure including a root node object;

b) reading a first character of a first key that is associated with a first data object;

c) adding a first node object that is a child of said root node object and assigning said first character to a node ID property of said first node object;

d) reading an additional character of said first key of said first data object;

e) adding a child node object and assigning said additional character to a node ID property of said child node object;

f) repeating the steps of reading an additional character and adding a child node object until all of said characters of said first key are assigned to node ID properties of node objects;

g) storing multiple data objects identified by the same key in a common node object;

h) containing the multiple data objects in the common node object in a data queue property in which the multiple data objects are sorted so as to provide an order (n) sort where (n) is the number of data objects stored in the data structure; and i) analyzing the data structure outside of the computer.

10. A method for generating a computer readable medium containing computer executable instructions and for creating a data structure for sorting data objects that are stored in a memory of a computer and that are associated with keys, comprising:

a) creating a data structure including a root node object;

b) reading a first character of a first key that is associated with a first data object;

c) adding a first node object that is a child of said root node object and assigning said first character to a node ID property of said first node object;

d) reading an additional character of said first key of said first data object;

e) adding a child node object and assigning said additional character to a node ID property of said child node object;

f) repeating the steps of reading an additional character and adding a child node object until all of said characters of said first key are assigned to node ID properties of node objects;

g) storing multiple data objects identified by the same key in a common node object;

h) containing the multiple data objects in the common node object in a data queue property in which the multiple data objects are sorted so as to provide an order (n) sort where (n) is the number of data objects stored in the data structure;

i) pushing said first object into the data queue property of a node object containing a last character of said key; and j) analyzing the data structure outside of the computer.

11. A method for generating a computer readable medium containing computer executable instructions and for creating a data structure for sorting data objects that are stored in a memory of a computer and that are associated with keys, comprising:

a) creating a data structure including a root node object;

b) reading a first character of a first key that is associated with a first data object;

c) adding a first node object that is a child of said root node object and assigning said first character to a node ID property of said first node object;

d) reading an additional character of said first key of said first data object;

e) adding a child node object and assigning said additional character to a node ID property of said child node object;

f) repeating the steps of reading an additional character and adding a child node object until all of said characters of said first key are assigned to node ID properties of node objects;

g) storing multiple data objects identified by the same key in a common node object;

h) containing the multiple data objects in the common node object in a data queue property in which the multiple data objects are sorted so as to provide an order (n) sort where (n) is the number of data objects stored in the data structure;

i) pushing said first object into the data queue property of a node object containing a last character of said key;

j) storing said data objects in the data queue property of a node object at an nth level where n is equal to a number of characters in said keys that are associated with said data objects; and k) analyzing the data structure outside of the computer.

12. A data structure created in memory for storing and sorting data objects for access by a computer application that is executed by a computer, wherein each data object is associated with a key, comprising:

a root node object;

a first level including x node objects where x is the number of unique first characters of said keys that are associated with said data objects; and a second level including y node objects wherein y is the number of unique words defined by combining first and second characters of said keys that are associated with said data objects, wherein multiple data objects that are identified by the same key are stored in the same node object so that the data objects are sorted in the data structure, and wherein data objects that are stored in a node object are contained in a data queue property in which the multiple data objects are sorted, and wherein the data structure provides an order (n) sort of the data objects where (n) is the number of data objects stored in the data structure.

13. A The data structure of claim 12 wherein said keys that are associated with said data objects have a variable length, and wherein said data object is stored in a node level that is equal to the number of characters in said key.

14. The data structure of claim 12 further comprising:

a third level including z node objects wherein z is the number of unique words defined by combining first, second, and third characters of said keys that are associated with said data objects.

15. The data structure of claim 12 wherein said node objects include at least one of a parent pointer property, a data flag property, a child pointer property, and a data queue property.

16. A data tree structure for providing an order (n) sort of data objects in a computer, wherein (n) is the number of data objects in the data tree structure, each data object being identified by a key, said data tree structure comprising a plurality of node objects configured in a string tree format where a series of one or more tree strings in the tree structure identifies a key and each object identifies a parent object in its key, wherein multiple data objects that are identified by the same key are stored in the same node object so that the data objects are sorted in the data structure, and wherein data objects that are stored in a node object are contained in a data queue property in which the multiple data objects are sorted.

* * * * *